(12) United States Patent
Quere et al.

(10) Patent No.: US 8,786,786 B2
(45) Date of Patent: Jul. 22, 2014

(54) METHOD FOR SELECTING AN AUDIO AND/OR VIDEO SERVICE RECEIVED

(75) Inventors: Thierry Quere, Monfort sur Meu (FR); Renaud Rigal, Cesson Sevigne (FR); Nicolas Caramelli, Rennes (FR)

(73) Assignee: Thomson Licensing, Issy les Moulineaux (FR)

( * ) Notice: Subject to any disclaimer, the term of this patent is extended or adjusted under 35 U.S.C. 154(b) by 440 days.

(21) Appl. No.: 12/734,209

(22) PCT Filed: Oct. 22, 2008

(86) PCT No.: PCT/EP2008/064309
§ 371 (c)(1),
(2), (4) Date: Apr. 19, 2010

(87) PCT Pub. No.: WO2009/053401
PCT Pub. Date: Apr. 30, 2009

(65) Prior Publication Data
US 2010/0231805 A1    Sep. 16, 2010

(30) Foreign Application Priority Data
Oct. 25, 2007   (FR) ...................... 07 58576

(51) Int. Cl.
*H04N 5/44* (2011.01)
*H04N 5/50* (2006.01)
(52) U.S. Cl.
CPC ... *H04N 5/44* (2013.01); *H04N 5/50* (2013.01)
USPC .......................................... 348/725; 348/731
(58) Field of Classification Search
CPC ........ H04N 5/44; H04N 5/455; H04N 5/4401
USPC ..................... 348/553–558, 725–733; 725/39
See application file for complete search history.

(56) References Cited

U.S. PATENT DOCUMENTS 6,188,447 B1 *   2/2001   Rudolph et al. .............. 348/729
7,061,542 B1 *   6/2006   Ikeguchi ....................... 348/558
(Continued)

FOREIGN PATENT DOCUMENTS

EP          1853058          4/2007
JP          11177939         7/1999
(Continued)

OTHER PUBLICATIONS

E. Alberty et al: "Adaptive Coding and Modulation for the DVB-S2 Standard Interactive Applications: Capacity Assessment and Key System Issues", IEEE Wireless Communications, IEEE Service Center, Piscataway, NJ. US, vol. 14, No. 4, Aug. 1, 2007, pp. 61-69.
Search Report Dated Dec. 3, 2008.

*Primary Examiner* — Michael Lee
(74) *Attorney, Agent, or Firm* — Tutunjian & Bitetto, P.C.

(57) ABSTRACT

Method for receiving audio and/or video services and an automatic selection step of audio or audio/video services.
In order to optimise access to varied services, the method comprises:
  a radio and/or television channel request step, referred to as a requested channel, then
  a determination step of at least two services representative of said requested channel, said services being received via distinct networks,
  a reception step of said at least two services, and
  an automatic selection step of one of said services according to at least one service quality parameter associated with each of said services at reception.

12 Claims, 10 Drawing Sheets

(56) References Cited

U.S. PATENT DOCUMENTS

Figure 1:
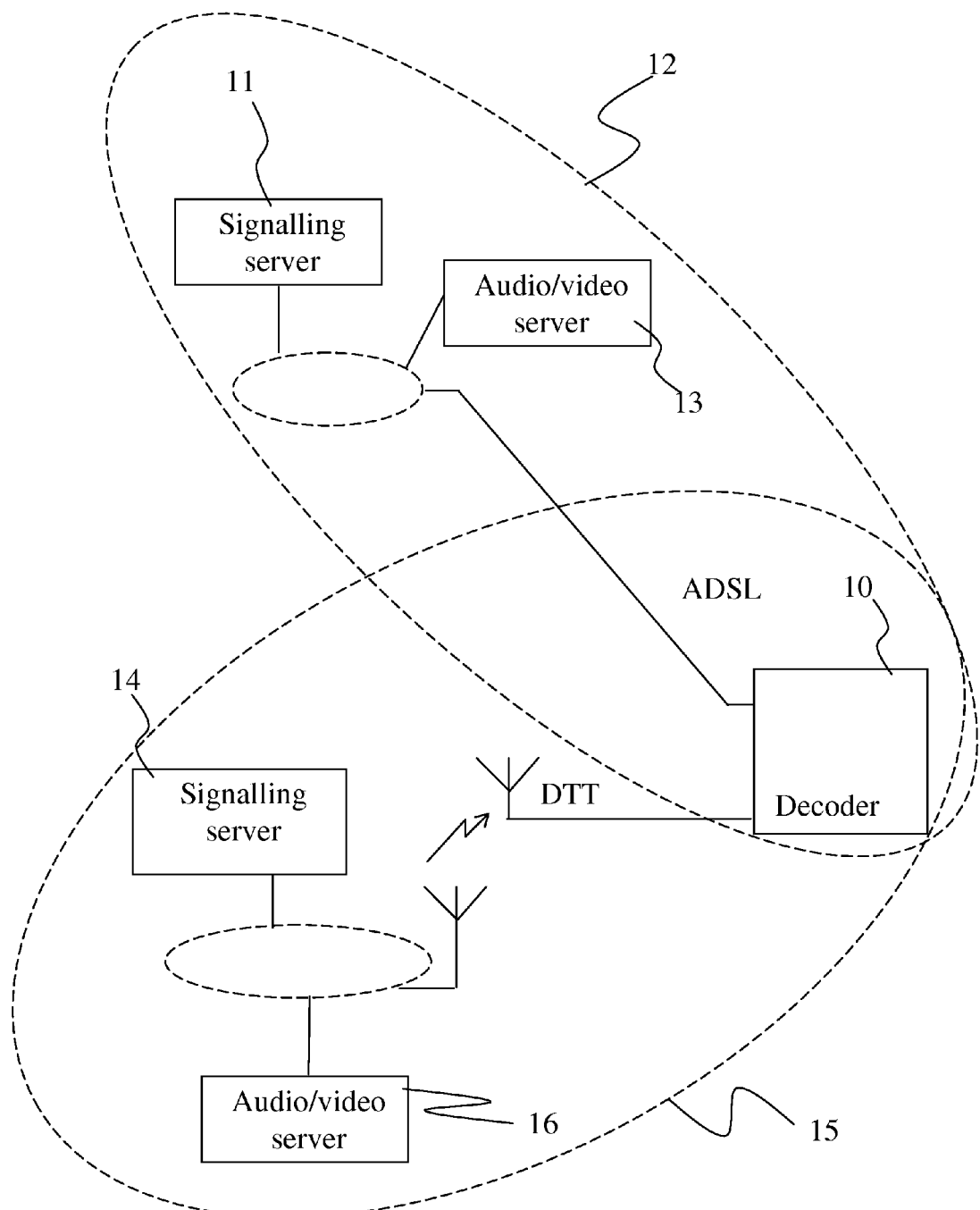

| | | | |
|---|---|---|---|
| 7,240,356 B2 * | 7/2007 | Iki et al. | 725/48 |
| 7,380,264 B2 * | 5/2008 | Potrebic | 725/74 |
| 2003/0185235 A1 | 10/2003 | Tomobe et al. | |
| 2005/0022237 A1 | 1/2005 | Nomura | |
| 2006/0035610 A1 | 2/2006 | Potrebic | |
| 2006/0259926 A1 | 11/2006 | Scheelke et al. | |
| 2006/0274202 A1 | 12/2006 | Kim | |
| 2011/0047569 A1 * | 2/2011 | Mears et al. | 725/39 |

FOREIGN PATENT DOCUMENTS

| | | |
|---|---|---|
| JP | 2003230125 | 8/2003 |
| JP | 2004158968 | 6/2004 |
| JP | 2005123859 | 5/2005 |
| JP | 2005223548 | 8/2005 |
| JP | 2007158623 | 6/2007 |
| WO | WO 00/52928 | 9/2000 |
| WO | WO 2008/002784 | 1/2008 |

* cited by examiner

METHOD FOR SELECTING AN AUDIO AND/OR VIDEO SERVICE RECEIVED

This application claims the benefit, under 35 U.S.C. §365 of International Application PCT/EP2008/064309 filed Oct. 22, 2008, which was published in accordance with PCT Article 21(2) on Apr. 30, 2009 in English and which claims the benefit of French patent application No. 0758576, filed Oct. 25, 2007.

1. FIELD OF THE INVENTION

The present invention relates to the domain of digital television reception. More precisely, the invention relates to the domain of audio and/or audio/video service selection.

2. TECHNOLOGICAL BACKGROUND

According to the prior art, a decoder (or terminal or "Set Top Box") enables a user to receive television or radio channels transported by services (here referred to as audio/video services) from different types of network. These television and/or radio channels comprise audio and/or video components or even interactive components. A radio channel chiefly comprises one or more audio components, while a television channel chiefly comprises one or more video components with one or more audio components. Several video components are for example used for the support of several standards (coding, resolution). Several audio components are for example used for the support of several languages. In different types of distribution networks, a same channel is thus transported in a different service and can comprise different components.

According to the prior art, a decoder can receive these services via an ADSL (Asymmetric Data Subscriber Line) network or via a DTT (Digital Terrestrial Television) type network or again by other broadcast types, such as satellite or cable.

According to the prior art, there are currently decoders called "hybrids" that enable reception of services from networks of different types, for example services from an ADSL type network and services from a DTT type network. Such a decoder type is capable of receiving an audio/video service transmitted by an audio/video service server belonging to a first network of ADSL type via a dedicated interface and of receiving another audio/video service transmitted by another audio/video service server belonging to another network of DTT type via another interface.

Of course, these networks can supply services for many terminals.

When the user of such a decoder wants to receive a channel, he first selects the network type (for example DTT or ADSL). Next, all of the channel changing commands that the user performs impact on all, or an extract of all the proposed services, of the selected network type.

According to the art, certain "hybrid" decoders enable the user to mix, in a channel change list commonly called a zapping list, services received from different network types, for example to complete a channel list with services that can only be received by another network type. Nonetheless, hybrid decoders present the disadvantage of not managing the received services optimally.

3. SUMMARY OF THE INVENTION

The purpose of the invention is to overcome the disadvantages of the prior art.

More particularly, the purpose of the invention is to optimise the selection of a service received via distinct networks.

For this purpose, the invention proposes a method for receiving audio/video services, comprising:

a radio and/or television channel request step, referred to as a requested channel, then a determination step of at least two services representative of said requested channel, said services being received via distinct networks, a reception step of said at least two services, and an automatic selection step of one of said services according to at least one service quality parameter associated with each of said at least two services at reception.

Here, an "automatic" selection corresponds to an autonomous decision taking operation of the decoder that does not require the intervention of the user.

The automatic selection step of one of said services enables selection of the service offering a quality of service sufficient in reception (that is superior to a determined threshold) and/or the best reception quality of service, associated with the services.

Here, the expression Quality of Service represents the quality of service at reception. Several parameter groups can influence this reception quality.

Advantageously, the quality of service parameter(s) are obtained outside of a decoding of services, that is without previous decoding processing of the service. Notably, it is possible to obtain these parameters from the signalling associated with the service.

In such a case, the quality of service parameter(s) advantageously belong to a first group comprising:

presence of an error correction code associated with the services, error correction code corrective power associated with the services, services bit rate, variation of service bit rates, and global information on the characteristics of the networks used to transport the services.

Global information can be for example information on weather conditions known to be susceptible to interfere with a wireless reception, attenuation of a line used to route a service and/or the sharing or not sharing of the line with other users.

In a second group, are found those that can often be obtained only during a decoding of a service. This second group comprises, for a received service, a number of detected errors, a number of missing packets, a number of packets out of time, a number of packets out of sequence and a variation of the packets arrival time. Advantageously, the parameters that are used to determine the QoS are from both groups simultaneously.

According to a specific embodiment, the automatic selection step of one of these services representative of the same channel depends on several QoS parameters associated with each of the services in reception. This function comprises the selection of service having the best QoS, determined from the QoS parameters.

According to a specific embodiment, the automatic selection step comprises a weighting step of QoS parameters that enables attributing of a particular appreciation to each parameter and enables a precise determination of the QoS according to the relative importance of each parameter.

According to a specific embodiment, the automatic selection step comprises an elimination of service(s) for which at least of these parameters has not attained a minimum determined value. This embodiment enables the rapid elimination of service(s) that do not fulfil a minimum requirement.

According to a specific embodiment, the automatic selection step comprises an elimination of service(s) for which at least one of these QoS parameters has not attained a minimal determined value as well as a weighting of QoS parameters.

According to a specific embodiment, the automatic selection comprises taking into account at least one secondary parameter associated with each of the services. These secondary parameters are advantageously part of a group of QoS parameters comprising the coding type of a service (for example H.264 or MPEG2), a compression rate of a required channel transported by a service, the geographical localisation of a source server and the number of network equipment hops to the source server. This embodiment enables the automatic selection to be performed taking into account a relatively large range of parameter types (QoS in reception parameters and secondary parameters).

According to a specific embodiment, the automatic selection step comprises the use of QoS parameters from the two groups referred to above as well as the parameters of a secondary group.

According to a specific embodiment, the method for receiving audio/video services comprises:

A reception step of a first list of services and at least a second list of services, A determination step of information representative of the quality of service at reception for each of the services of the first list of services, At least one determination step of information representative of the quality of service at reception for each of the services of the second list of services.

This method enables association with each service available on each of the networks of easy to use information representative of the quality of service.

Advantageously, the above method comprises the construction of a 'concatenation' list of services comprising services that belong to the first list and the second list and that are selected during the selection step. In this concatenation list there are services from both the first and second lists. For services that are received by distinct networks but that are representative of the same channel, advantageously, a single element of the list is created and this element comprises the references to the first and second list. Naturally, the construction of this concatenation list is not limited to the concatenation of only two lists but is compatible with a concatenation of more that two lists of services received via distinct networks (for example 3, 4, 10, etc.).

The method for receiving audio/video services comprises a determination step of at least two services representative of the same channel, these services being received via distinct networks, and determined according to at least one similarity parameter.

According to a particular characteristic, the similarity parameter(s) belong to a group comprising a service name, a service identifier, an identifier of the associated channel and a source identifier. A service identifier is for example a DVB triplet according to the DVB-SI standard (or ETSI 300 468). An example of a channel identifier associated with a service is a "TV-Anytime" tag according to the ETSI TS 102 822 standard. An example of a source identifier is an IP (Internet Protocol) number and a port number of a broadcast address.

The similarity parameter(s) are advantageously obtained during:

a determination step of the variation of at least part of the video signals corresponding to a service and obtained during decoding, and a correlation step between the variations of at least one part of the signals corresponding to a first service and at least one part of the signals corresponding to at least one second service, these first and second services being received via distinct networks.

The term "at least one part" corresponds to a part or the whole.

This correlation step comprises for example an analysis of the variation of the chrominance signal of a composite video signal, or again the variation of the red component of a RVB video signal.

The step for obtaining one or more similarity parameters according to these two steps enables precision and offers a local solution in the decoder and thus avoids an arrangement on the server side, for example by the provision by one of the signalling servers of a correspondence table between the services of different networks.

According to a variant embodiment, a correspondence table received by one or more networks enables identification of representative services of the same channel. This variant enables, for the decoder, the task of determining the similarity between several received services by distinct networks to be lightened.

According to a specific embodiment, the step for determining at least two services representative of the same channel comprises, a step for determining the variation of at least one part of the video signals corresponding to a service and obtained during decoding, a step of correlation between the variations of at least a part of the corresponding signals, and a correspondence table. This enables determination with even more certitude of similarity between several services.

According to an embodiment variant, the step of automatic selection is performed during a change of channel. This enables the quality of service at reception at the instant of the changing of the channel and/or a progression in the QoS at reception to be taken into account.

According to another embodiment variant, the step for automatically selecting a service is carried out following an event belonging to a group comprising a change in the composition of the service lists of each network, a connection of the decoder to a new network, the disconnection of a decoder from a network, a modification of at least one of the parameters of an audio/video component of one or more services, and a modification of at least one of the transport parameters of one or more services. This variation enables the quality of service to be taken into account outside of the changing of the channel and can be part of a process performed in the background, without interfering with the operation of the decoder when it is performing a task with a higher priority.

According to a variant of the embodiment, the step for automatically selecting a service is carried out during a change of channel and following an event belonging to a group comprising a change in the composition of the service lists of each network, a connection of the decoder to a new network, the disconnection of a decoder from a network, a modification of at least one of the parameters of an audio/video component of one or more services, and a modification of at least one of the transport parameters of one or more services. This variant enables better management of the calculation resources of a decoder.

4. LIST OF FIGURES

Figure 2:
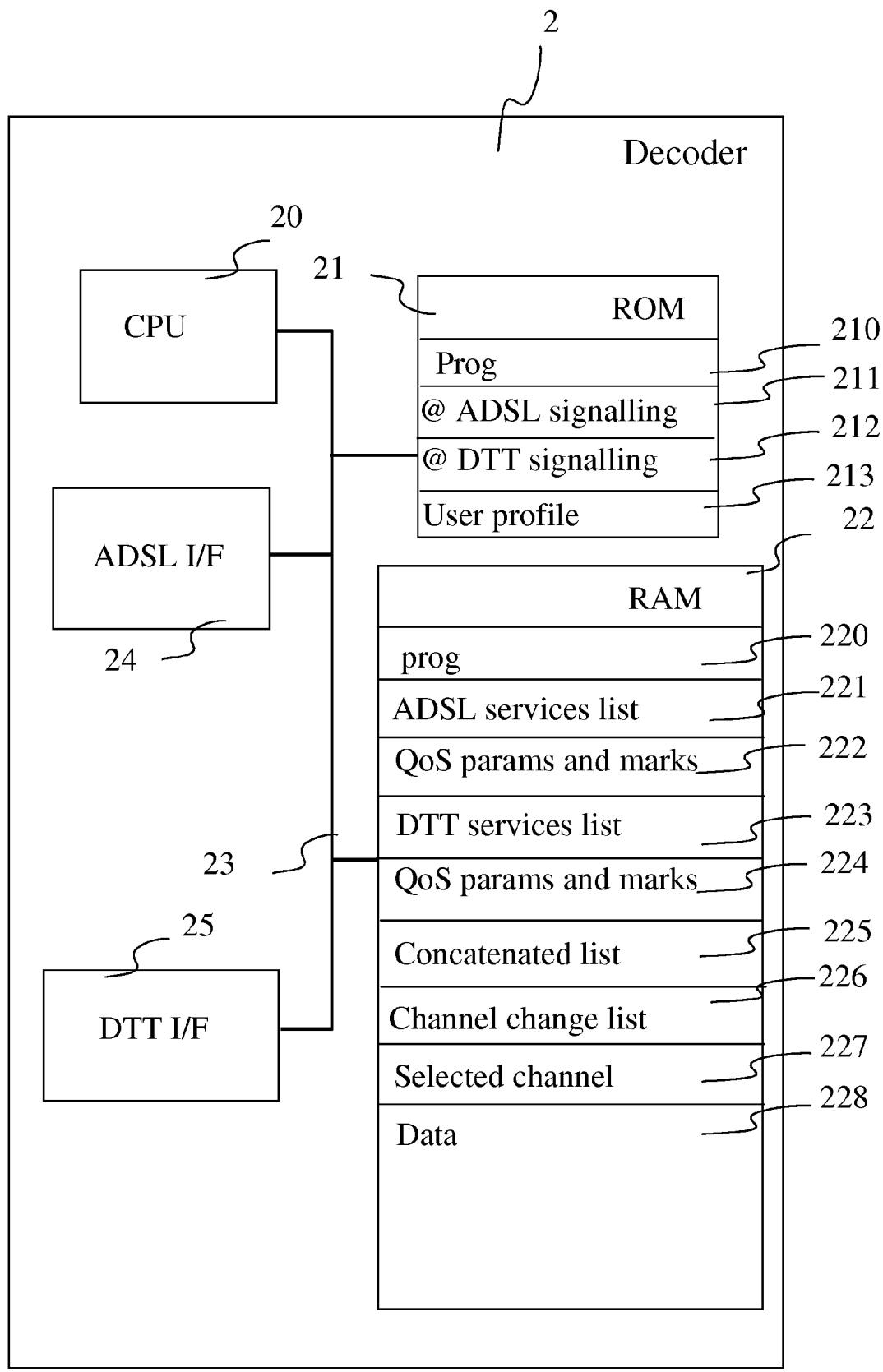
Figure 3:
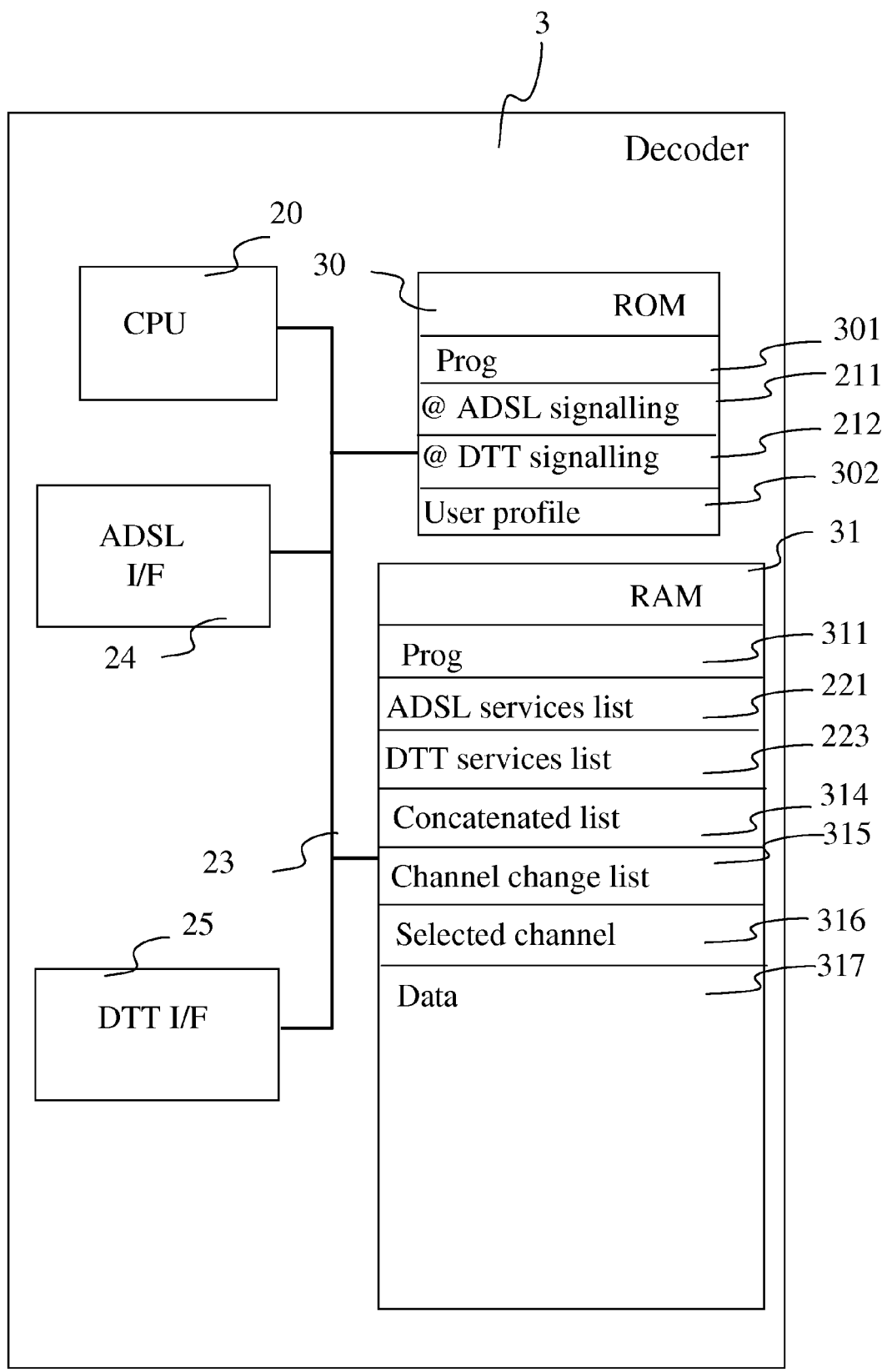
Figure 4:
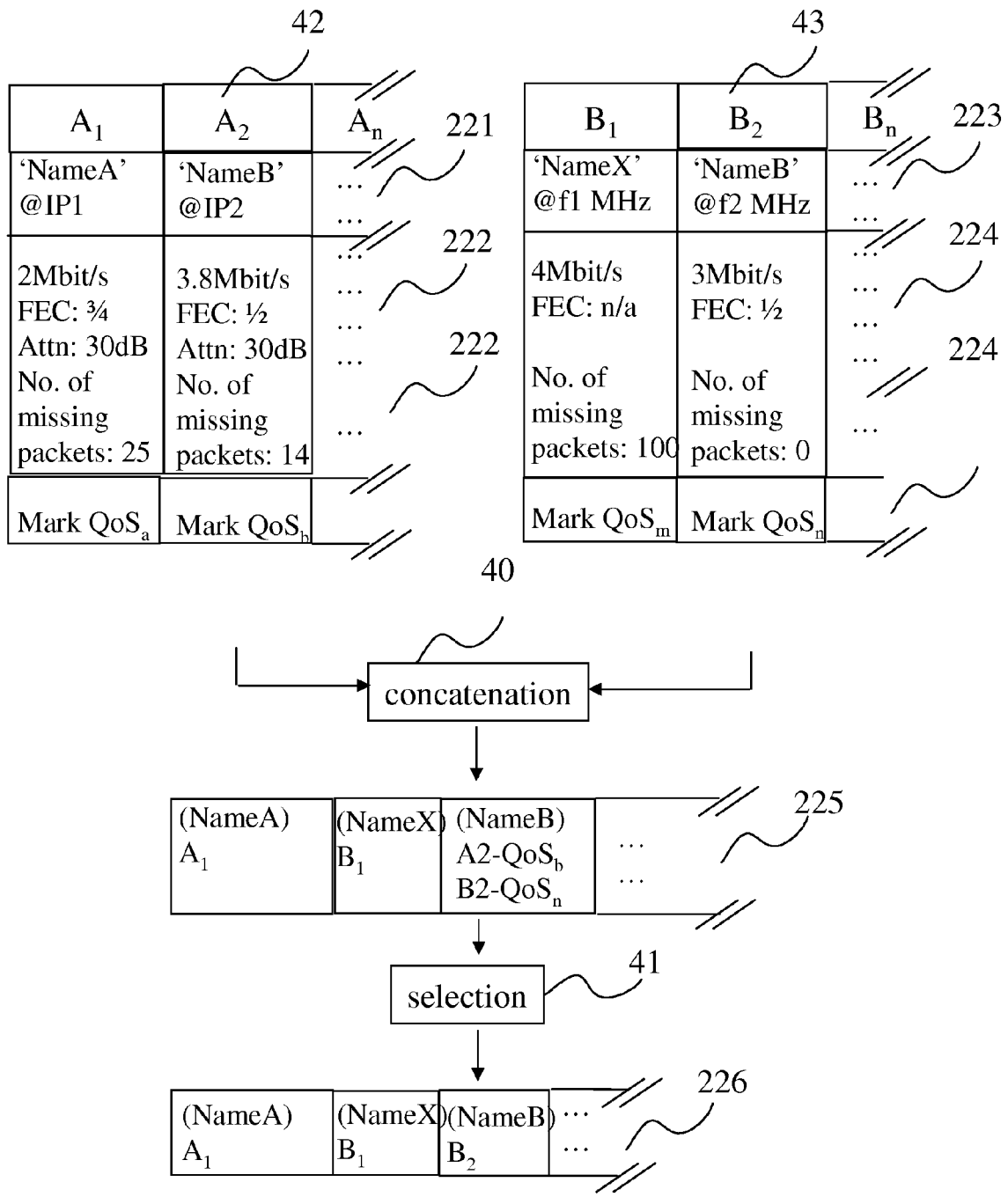
Figure 5:
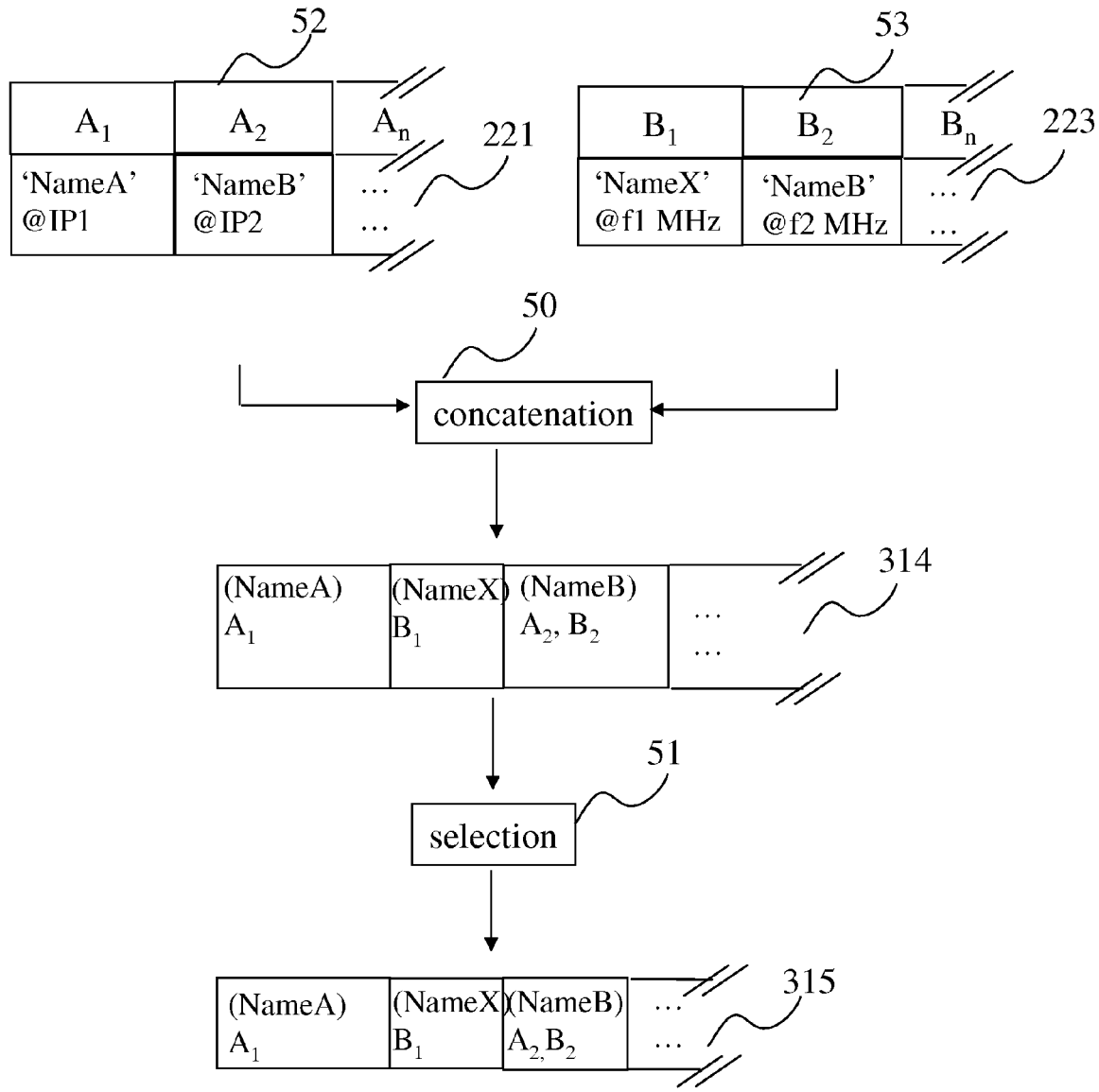
Figure 6:
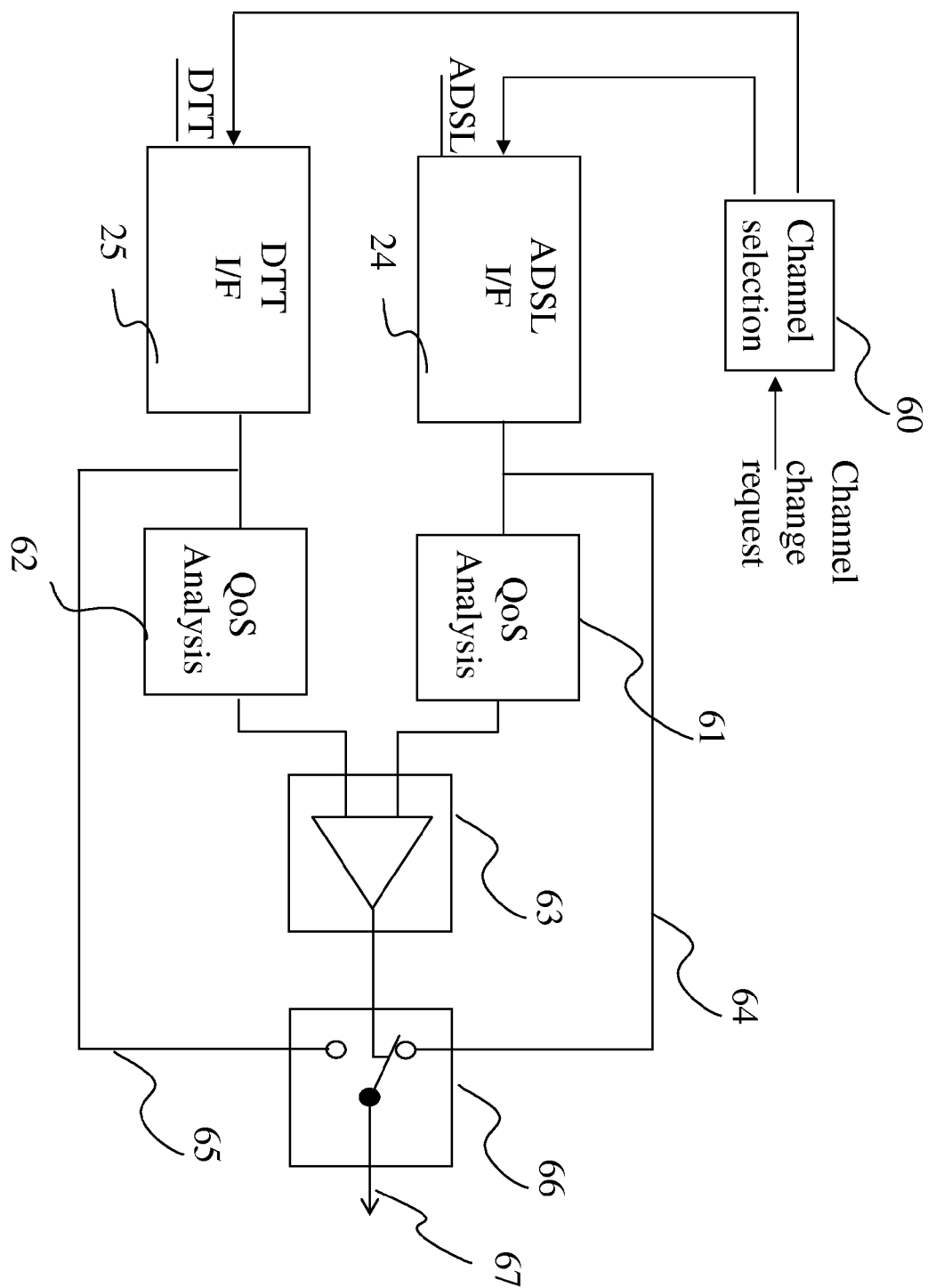
Figure 7:
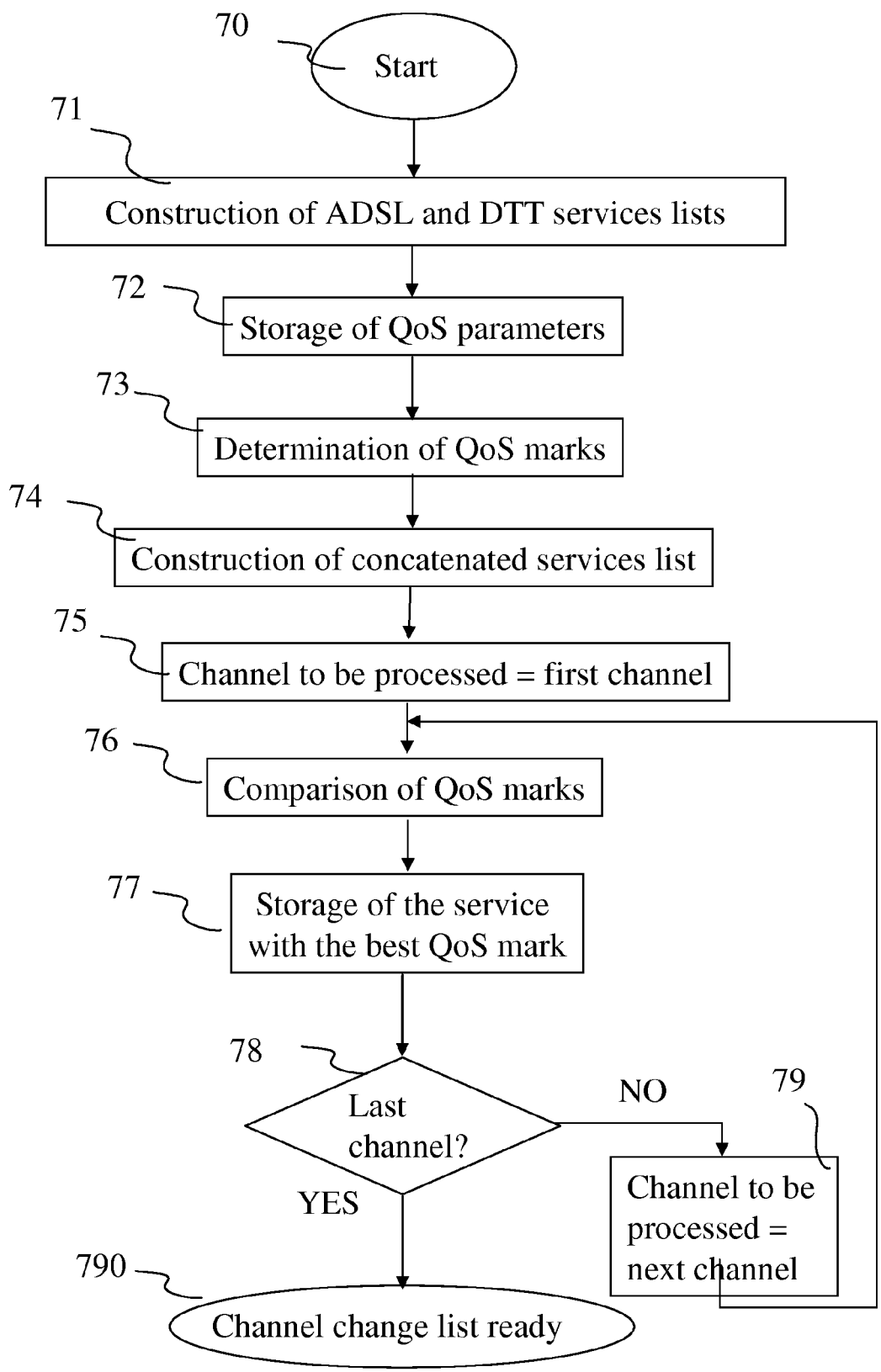
Figure 8:
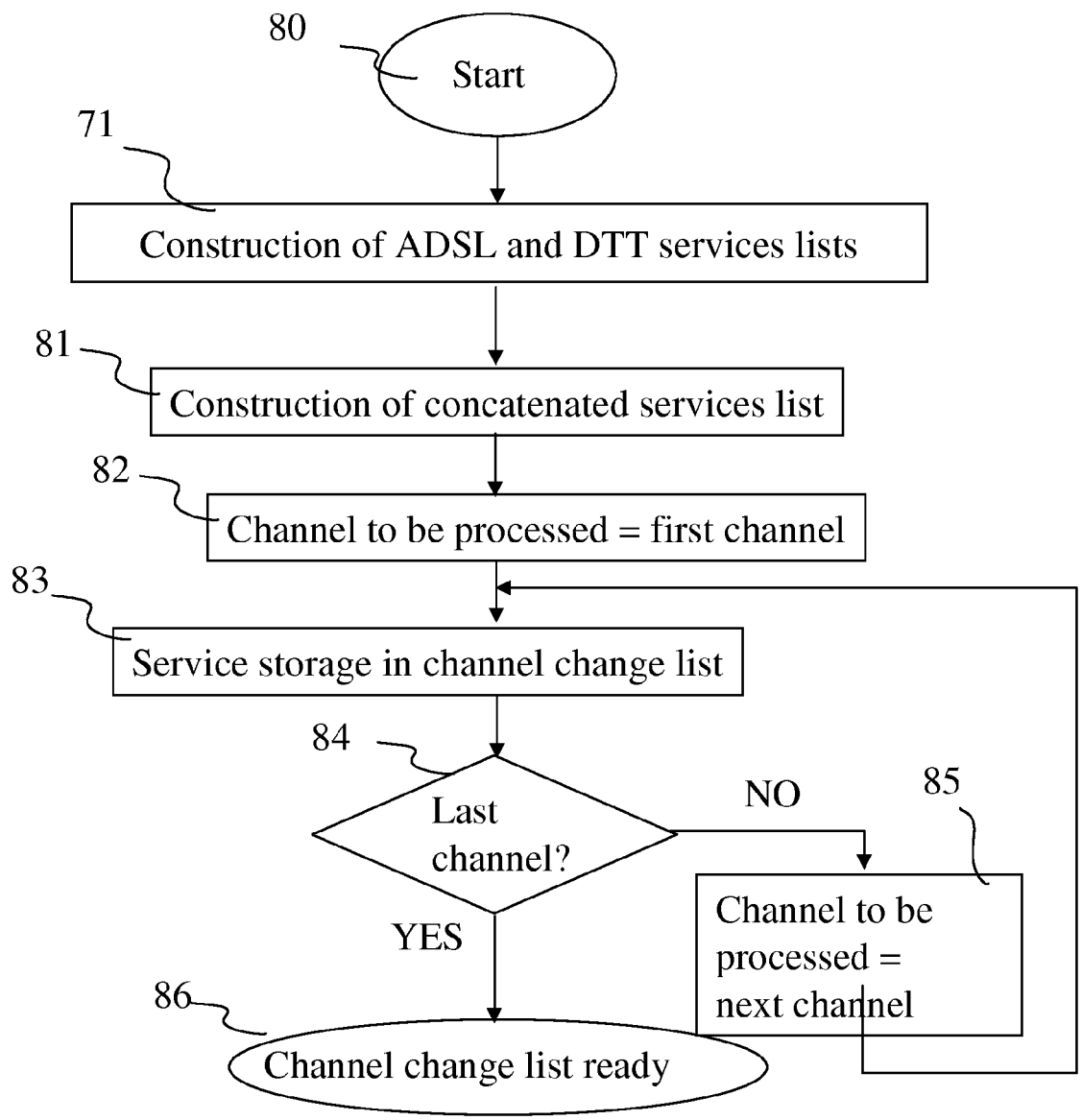
Figure 9:
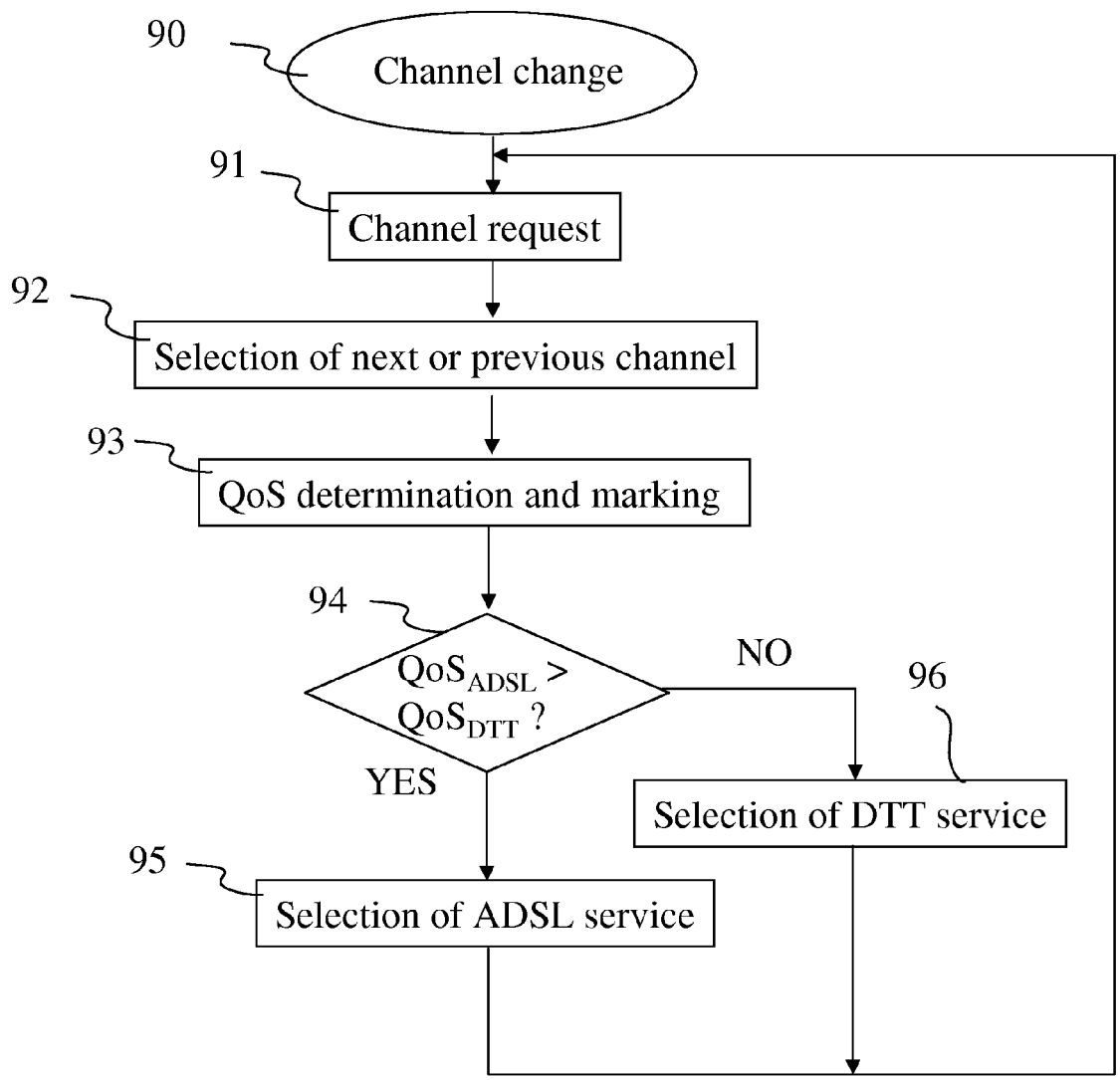
Figure 10:
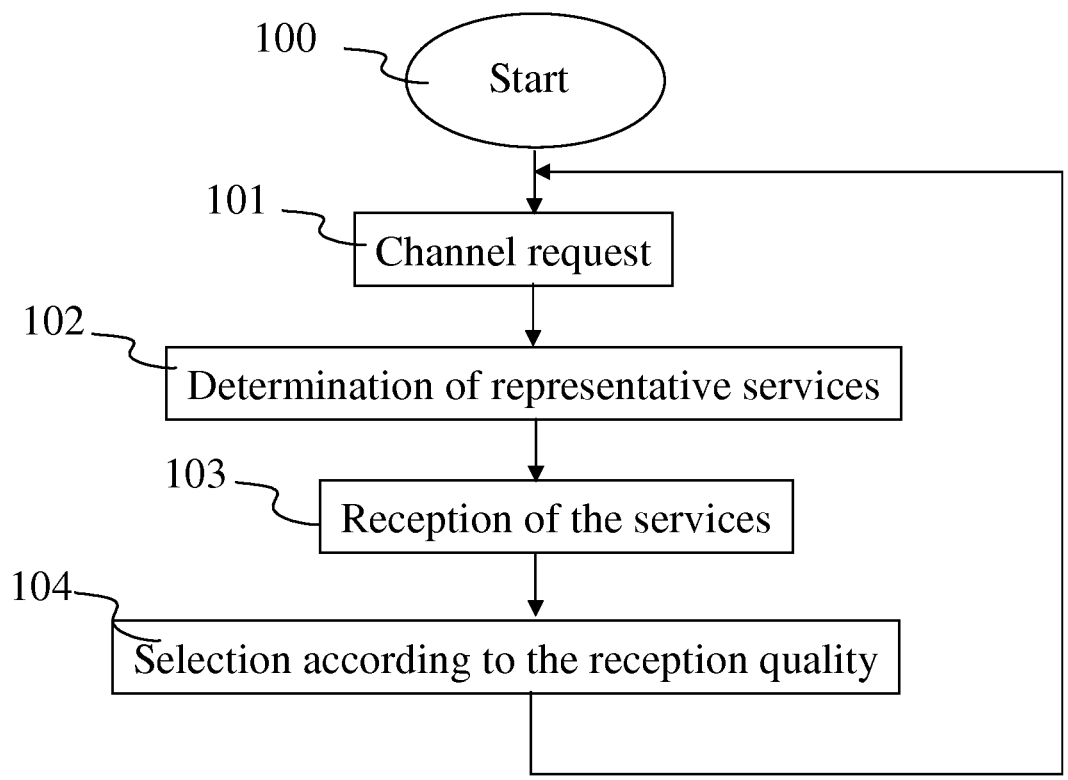

The invention will be better understood, and other specific features and advantages will emerge upon reading the following description, the description making reference to the annexed drawings wherein:

FIG. 1 illustrates a network infrastructure comprising a hybrid decoder according to a particular embodiment of the invention, the hybrid decoded being coupled with two different types of network, FIGS. 2 and 3 represent decoders according to two embodiments of the invention, these decoders are part of the infrastructure of FIG. 1, FIGS. 4 and 5 represent different lists used by a decoder from FIG. 2 or 3 respectively, FIG. 6 represents a logical diagram of a decoder of FIG. 3, FIG. 7 presents an algorithm implemented in the decoder of FIG. 2, FIGS. 8 and 9 represent algorithms implemented in the decoder of FIG. 3, and FIG. 10 illustrates a method implemented in one of the decoders of FIG. 2 or 3.

5. DETAILED DESCRIPTION OF THE INVENTION

It is noted that the word "register" used in the description hereafter designates in each of the memories mentioned, a memory zone of low capacity (some binary data) as well as a memory zone of large capacity (enabling a whole programme to be stored or all or part of the data representing an audio/video service received).

FIG. 1 presents a diagrammatic block diagram of an infrastructure comprising two networks 12 and 15 implementing the invention with a decoder 10 linked to an ADSL wired network 12 and a wireless DVB-T (Digital Video Broadcasting-Terrestrial) network 15 according to the ETSI EN 300 744 standard.

The network 12 comprises a signalling server 11 enabling the decoder 10 to discover the services proposed by the network 12.

The network 12 also comprises an audio/video server 13 enabling the decoder 10 to receive an audio/video service corresponding to one of the services proposed by the network 12.

The network 15 comprises a signalling server 14 enabling the decoder 10 to discover the services proposed by the network 15.

The network 15 also comprises an audio/video server 16 enabling the decoder 10 to receive an audio/video service corresponding to one of the services proposed by the network 15.

Depending on the variant, the networks 12 and 15 comprise several audio/video servers (for example 2, 3, 4 or more) and/or several signalling servers as well as other items of equipment necessary to a correct performance.

The decoder 10 comprises interfaces for each of the two types of network 12 and 15. The decoder 10 is suitable to receive services and their associated signalling both from network 12 and network 15.

To simplify the description, the networks 12 and 15 are represented with a single decoder. Depending on the variants, the networks 12 and 15 comprise several decoders (for example 2, 3, 10, etc.) suitable to receive services.

In addition, the decoder 10 is, according to FIG. 1, represented with two ADSL and DTT type inputs. According to the variants of the invention, a decoder comprises more than two inputs and comprises, for example, ADSL, DTT or other types of inputs, notably of the mobile, satellite and/or cable type.

FIG. 2 diagrammatically illustrates the decoder 10.

The decoder 2 comprises, interconnected by an address and data bus 23:

A CPU (Central Processing Unit) 20,
a non-volatile memory of ROM (Read Only Memory) type 21,
a Random Access Memory (RAM) 22,
an interface 24 enabling reception of audio/video services as well as associated signalling from the ADSL network 12, and
an interface 25 enabling reception of audio/video services as well as associated signalling from the DTT network 15.

The memory ROM 21 comprises in particular:
a program 'prog' 210,
an address of an ADSL network signalling server 211
an address of a DTT network signalling server 212
a user profile 213, notably enabling recording of the list of personalised channel changes of a user.

The algorithms implementing the steps of the method described hereafter are stored in the ROM 21 associated with the decoder 10 implementing these steps. When powered up, the microprocessor 20 loads and runs the instructions of these algorithms.

The random access memory 22 notably comprises:
in a register 220, the operating programme of the CPU 20 responsible for switching on the decoder 10,
the list of services transmitted by the signalling server 11 in a register 221,
for each of the services of the register list 221, a list of parameters relating to the quality of service, as well as information representing a mark for the QoS, determined by said parameters, in a register 222,
the list of services transmitted by the signalling server 14 in a register 223,
for each of the services of the register list 223, a list of parameters relating to the quality of service, as well as information representing a mark for the QoS, determined by said parameters, in a register 224,
a concatenated list of services 225 received from the networks 12 and 15,
a channel change list used by the user of the decoder 10, in a register 226, and
A pointer to a selected channel (also called "current channel") in the list 226, in a register 227.

FIG. 3 diagrammatically illustrates a decoder 3 according to an embodiment variant of the decoder 10.

The common elements of the decoders 2 and 3 have the same names and references and will not be described in further detail.

The decoder 3 comprises, interconnected by an address and data bus 23:
a microprocessor 20 (or CPU);
a non-volatile memory of ROM (Read Only Memory) type 30,
a Random Access Memory (RAM) 31,
an interface 24, and
an interface 25.

The memory ROM 30 comprises in particular:
a program 'prog' 301,
an address of an ADSL network signalling server 211
an address of a DTT network signalling server 212
a user profile 302, notably enabling recording of the list of personalised channel changes of a user.

The algorithms implementing the steps of the method described hereafter are stored in the ROM 30 associated with the decoder 3 implementing these steps. When powered up, the microprocessor 20 loads and runs the instructions of these algorithms.

The random access memory 31 notably comprises:
  in a register 311, the operating programme of the microprocessor 20 responsible for switching on the decoder 3,
  a list of services 221,
  a list of services 223,
  a concatenated list of services 314 received from the networks 12 and 15,
  a channel change list used by the user of the decoder 3, in a register 315, and
  a pointer to a selected channel (also called "current channel") in the list contained in the register 315, in a register 316.

FIG. 4 diagrammatically illustrates the method for obtaining the channel change list implemented by the decoder 2.

The lists 221, 222, 223 and 224 are represented in the tables 42 and 43. In these tables, are indicated the references of elements of these tables, A1-An for table 42, and B1-Bn for table 43. These tables each contain the set of services available on the two respective networks as well as the parameters and information representative of the associated QoS marks.

More precisely, table 42 comprises the list of services 221 transmitted by the signalling server 11 belonging to the ADSL network. As an example, in the element A1, the name of the service "NameA" is found, as well as a service identifier "@IP1" enabling connection to the service. For an ADSL type network, the identifier can be for example an IP address. Then for each of the services in this list 221, a set of parameters relating to the quality of service are found as well as information representative of a QoS mark, determined from these parameters. The quality of service parameters provided as an example are the service binary bit-rate, an FEC (Forward Error Correction) rate, an attenuation value of the ADSL line and number of packets missing. According to the example illustrated, in the element A1 for a service with the name "NameA", is found, a binary speed of 2 Mbit/s, an FEC rate of ¾, an attenuation of the ADSL line of 30 dB and a number of missing packets at 25 and representative information of a mark that provides a synthesis of the QoS, determined from these parameters.

The table 43 comprises the list of services 223 transmitted by the signalling server 14 of the DTT network. For example, in the element B1 of table 43 are found, a service having the name "NameX", as well as a service identifier "@f1" enabling connection to this service. As this network is of DVB type, the identifier is a frequency. As an example, the binary bit-rate of the service (4 Mbit/s in the element B1), an FEC power (n/a in the element B1) and a mark that provides a synthesis of the QoS determined from these parameters, are illustrated. According to the example illustrated are found, in the element B2, for a service with the name "NameB" a binary bit-rate of 3.8 Mbit/s, an FEC rate of ½, an attenuation of 30 dB of the ADSL line, as well as the number of missing packets of 14. In the element B1, for a service with the name "NameX" a binary bit-rate of 4 Mbit/s, an FEC rate equal to n/a (not applicable), and 100 for the number of missing packets, are found. In the element B2, for a service with the name "NameB", a binary bit-rate of "3 Mbit/s", an FEC rate of ½, and 0 for the number of missing packets are found. For the service in the element A1, a mark QoSa is found, for the service in the element A2, a mark QoSb is found, for the service in the element B1, a mark QoSm is found and, for the service in element B2, a mark QoSn is found.

To illustrate that the tables 42 and 43 can have more than two elements, the table 42 is shown with an element An, and the table 43 is shown with an element Bn.

Several determination variants of a QoS mark from these parameters can provide different QoS marks. For example:

For a variant where a weighting method is applied, the QoSb and QoSn marks can be calculated in the following manner.

Each parameter has a correspondence table that enables giving an index value between 0 and 10. The purpose of this index is to standardise the QoS parameter by assigning it a value between 0 and 10. An index value of 10 is, from the viewpoint of QoS, better than an index value of 0. Consider the correspondence table for the binary bit-rate parameter below:

| Binary bit rate "bbr" (Mbit/s) | Index value |
| --- | --- |
| ≥4 | 10 |
| 3 ≤ bbr < 4 | 8 |
| 2 ≤ bbr < 3 | 6 |
| 1 ≤ bbr < 2 | 4 |
| <1 | 0 |

To a binary bit-rate above 4 Mbit/s, an index value of 10 is assigned, while a binary bit-rate below 1 Mbit/s is assigned an index value of 0 (binary bit-rate considered to be insufficient).

The same type of table is generated for the FEC parameters, line attenuation and number of missing packets:

| FEC (rate) | Index value |
| --- | --- |
| ≤½ | 10 |
| ¾ | 7 |
| >¾ | 6 |
| absent | 0 |

In the case of FEC absence, the index value 0 is assigned.

| Line attenuation "attn" (dB) | Index value |
| --- | --- |
| <10 | 10 |
| 10 ≤ attn < 20 | 8 |
| 20 ≤ attn < 30 | 7 |
| 30 ≤ attn < 40 | 6 |
| 40 ≤ attn < 50 | 3 |
| >50 | 0 |

| Number of missing packets (out of 100) | Index value |
| --- | --- |
| 0 | 10 |
| 1 ≤ nbmp < 10 | 9 |
| 10 ≤ nbmp < 20 | 6 |
| 20 ≤ nbmp < 30 | 3 |
| >30 | 0 |

The weighting method comprises an assignment of a weighting factor to each quality of service parameter. For example, the weighting factors for the various parameters previously cited are:

| Parameter | Weighting factor |
| --- | --- |
| Binary bit-rate | 2 |
| FEC rate | 3 |
| Attenuation | 2 |
| Number of missing packets | 3 |

In this example the sum of the weighting factors is equal to 10 to obtain a final QoS mark comprised between 0 and 100 (see the following table detailing the calculation of the final QoS mark)

A QoS mark is then calculated for each element of the tables 42 and 43. For example, the QoS mark for the A2 element of table 42 is obtained in the following way:

| Parameter | Value | Index | Weighting | Result |
|---|---|---|---|---|
| Binary bit-rate | 3.8 | 8 | 2 | 16 |
| FEC | ½ | 10 | 3 | 30 |
| Attenuation | 30 | 7 | 2 | 14 |
| Number of missing packets | 14 | 6 | 3 | 18 |
| QoSb mark | | | | 78 |

Likewise, the QoSn mark, of element B2 of table 43 is obtained in the following way:

| Parameter | Value | Index | Weighting | Result |
|---|---|---|---|---|
| Binary bit-rate | 3 | 8 | 2 | 16 |
| FEC | ½ | 10 | 3 | 30 |
| Attenuation | 10 | 10 | 2 | 20 |
| Number of missing packets | 0 | 10 | 3 | 30 |
| QoSn mark | | | | 96 |

According to another variant, the parameters obtained during decoding are not taken into account, for example, the number of missing packets. In this case, by using the example above, a value of 0 is assigned to the number of missing packets (index equals 10) so as not to influence, in a negative manner, the final mark. Hence, the final QoSb mark is 90 while the QoSn mark remains unchanged.

If the list 224 is compared with the list 222, the absence of the attenuation parameter can be observed as this parameter is specific to the ADSL type network.

The service identifiers illustrated in FIG. 4 are provided as an example, these identifiers are not exhaustive and can be completed and suitable to the network type used.

The decoder 2 constructs the list 225 after a concatenation of lists 221 and 223. The set of services present in the lists 221 and 223 is registered in the list 225. If a same service exists in the two lists 221 and 223, a single element is advantageously created in the list 225. In the example illustrated this is the case for the service "NameB" that is found in both table 42 and in table 43. To each element of the list 225 is associated an element number from the lists 221 and/or 223, as well as only the item(s) of information representative of the QoS marks for these services. Hence the list 225 enables the set of services available on the two networks to be found as well as finding an identifier for each service enabling connection. In addition, the list enables the QoS mark(s) for each service to be found rapidly.

The channel change list 226 is obtained after a selection process 41 that comprises creation of the list 226 based on the list 225, conserving for each service the corresponding element number from lists 221 or 223 having the best QoS mark. Hence, this channel change list 226 enables, for each of the services of the lists 221 and 223, the service identifier having the best QoS mark to be found rapidly and to be connected to it.

Using the example described in the tables above, the element B2 of table 43 is selected for the channel "NameB" in the channel change list because this service has the best QoS mark.

According to another variant, a sufficiency threshold is determined. This means that as soon as the mark of a received service exceeds a threshold, this service is selected automatically without even calculating the mark of the same service received by a different network. By again taking the example described in the tables above, if the sufficiency threshold is fixed at 60, the service A2 can be selected (mark=78) without even calculating the mark of service B2.

According to another variant, secondary parameters are taken into account, for example the format of the source coding.

According to another variant, a service is selected not only on a comparison of marks as previously described, but also on a criterion of exceeding a determined threshold. To do this, a threshold is defined for each quality of service parameter. If for a given service from table 42 or 43 one of the quality of service parameters does not attain the threshold, this service is eliminated from the service list 225.

According to another variant, a minimum mark is determined. If a service mark does not exceed this minimum mark, this service is automatically removed from the processing of selection 41. By taking again the example described in the tables above, if the minimum mark is fixed at 80, the service A2 is removed from selection 41.

The channel change list can comprise a subset of elements of the concatenated list 225, that provides the user with a means to create his own list of channels, by allowing him to eliminate channels of little or no interest to him. In the case of a channel change list 226 that already exists, the processing of selection 41 comprises a copy in this list 226, of the numbers of service elements from the list 225 corresponding to services found in the channel change list, and by selecting from the list 225 the element number from the list 221 or 223 of the service having the best QoS mark.

The names of services between brackets in the lists 225 and 226 are indicated as an example for a better comprehension of FIG. 4, however they are not mandatory for the correct operation of the present invention.

FIG. 5 diagrammatically illustrates a method to obtain the channel change list required by the user of decoder 3 according to a variant of an embodiment of the invention.

Tables 52 and 53 of FIG. 5 each contain the available services on the ADSL and DTT networks from lists 221 and 223 respectively. In these tables, the references of elements from these tables are indicated, A1-An for table 52, and B1-Bn for table 53.

More precisely, table 52 contains the list 221 of services transmitted by the ADSL network. As an example, in the element A1, the name of the service "NameA" is found, as well as a service identifier "@IP1" enabling it to be received. As this network is of ADSL type, the identifier is an IP address. In the element A2, the name of the service "NameB" is found, as well as a service identifier "@IP2" enabling it to be received. Next, in this table an element 'An' is found to indicate that this table can contain more than two elements.

Table 53 contains the list 223 of services transmitted by the DVB network. For example, in the element B1 is found, the name of the service "NomX", as well as an identifier "@f1 MHz", that represents the frequency setting of the interface 25, enabling this service to be received. In the element B2, the name of the service "NameB" is found, as well as a service identifier "@f2" enabling it to be received. Next, in this table an element 'Bn' is found to indicate that this table can contain more than two elements.

The service identifiers illustrated in FIG. 5 are provided as an example, these identifiers are not exhaustive and can be completed and suitable to the network type used.

The decoder 3 constructs the list 314 after a concatenation 50 of the lists 221 and 223. In this concatenated list 314 figuring the set of elements from the two lists 221 and 223. For each elements created in the list 314, there is at least one element in the lists 221 or 223. If a service representing a same channel exists in these two lists 221 and 223, a single element is created in the list 314. According to the example illustrated, a single element is created in the list 314 for the service "NameB" that appears in the two lists 221 and 223. Advantageously, the concatenation function is based on the determination of a similarity between two services coming from two distinct networks. This determination of similarity can be made by, notably:

- a comparison of channel names, as obtained by signalling,
- a comparison of service identifiers, as defined by the applicable standards at signalling. The service identifiers are for example: the DVB triplet (standard DVB-SI for "Digital Video Broadcasting-Service Information", ETSI standard EN 300 468), used in the standard DVB-IP (Digital Video Broadcasting—Internet Protocol, ETSI standard TS 102 034) for transmission by ADSL, and also used in the standard DVB-T (ETSI standard EN102 034) for transmission by DTT,
- a comparison of channel, services, or contents identifiers, as defined by the TV-Anytime standard (ETSI standard TS 102 822) and used in the DVB-IP standard referred to above,
- a comparison of source identifiers, present in the service, like a logo, or even by the presences of a watermark in the service,
- an analysis of the variation of the video signal obtained after decoding,
- an item of correspondence information provided by a signalling source,
- or any other method.

With each element of the list 314, an element number from the lists 221 and/or 223 is associated. Hence, the list 314 enables the set of services available on the two networks to be found again and an identifier for each service to be found, enabling connection to it.

The channel change list 315 is obtained after a selection 51 that enables creation of the list 315 based on the list 314. The channel change list can constitute a subset of elements from the concatenated list 314, which provides the user with the means to create his own list of channels, by allowing him to eliminate channels of little or no interest to him. In the case of a channel change list 315 that already exists, the selection 51 comprises the copy in this list 315 of element numbers of services from the list 314 corresponding to services already present in the channel change list 315. Hence, this channel change list 315 enables the service identifier(s) to be found rapidly and connected to them.

The service names are indicated between brackets in the lists 314 and 315 for improved comprehension of this figure, however they are not necessary to the operation of the present invention.

FIG. 10 illustrates a method implemented in one of the decoders of FIG. 2 or 3.

The process begins with a step 100 during which different variables are created and initialised.

Next, during a step 101, a channel request is received.

Then, during a step 102, a determination of services representative of this channel is carried out.

Then during a step 103, these services are received via the interfaces 24 and 25.

Next, during a step 104, a service is selected automatically according to one or more parameters of the associated QoS.

Then, step 101 is repeated.

FIG. 6 diagrammatically illustrates a selection method implemented by the decoder 3.

A service selection function 60 receives a command to change channel. This function 60 uses the channel change list 315 and the service lists 221 and 223 to find the service identifiers representing the selected channel. These identifiers are used to control the ADSL 24 and DTT 25 interfaces so as to set up the reception of the two services representing the same channel, coming from respectively the two distinct networks 12 and 15.

The decoder 3 carries out an analysis 61 (and respectively 62) of the quality of service at reception, of a service from the interface 24 (and respectively 25).

A comparison 63 is performed on the result supplied by each of the analysis's 61 and 62. The comparison 63 activates a switch 66 to select the service providing the best quality according to the analysis's 61 and 62. The switch 66 directs one or other of the services 64 or 65 to an output 67. The output 67 supplies the decoding circuits and display of the decoder.

According to a variant, the analysis of QoS made during the analyses 61 and 62 comprises the determination of a mark representative of the QoS by synthesis of quality of service parameters that can be obtained during the decoding of services, such as a number of errors detected, a number of packets missing, a number of packets out of time, a number of packets out of sequence, and also a variation in the arrival time of packets.

According to a variant, the QoS analysis made by the functions 61 and 62 are carried out on these services after processing error corrections, if the services contain additional information enabling such correction, such as for example the packing of packets with a header providing the sequence number, or the presence of an accuracy checking code (for example: "hash" function, parity, CRC (Cyclic Redundancy Check) or the presence of one or more FEC additional flows.

According to another variant, the QoS analysis performed by the functions 61 and 62 comprises the determination of a mark representative of the QoS by synthesis of QoS parameters that can be obtained outside of the decoding of services, such as the presence of a error correction code associated with the services, a corrector power of such an error correction code, a service binary bit-rate, a variation of the binary bit-rate of services and global information on the characteristics of the networks used to transport these services.

According to another variant, the QoS analysis performed by the functions 61 and 62 comprises the determination of a mark representative of the QoS by synthesis of QoS parameters at reception and of secondary parameters, such as a coding type parameter, a compression rate for the required channel, a source server geographical location parameter, a parameter indicating the number of network equipment skips up to the source server.

According to different embodiments, the analyses 61 and 62 using a QoS parameters weighting method, or an elimination method of a service or services having one or more QoS parameters that have not attained a determined minimum value, or by a combination of the two methods.

FIG. 7 diagrammatically illustrates an algorithm for obtaining the channel change list implemented in the decoder 2.

Obtaining the channel change list begins with step 70 during which different variables are created and initialised.

Then, during a step 71, the decoder 2 carries out a connection of the interfaces 24 and 25 to the signalling servers 11 and 14 of networks 12 and 15 respectively, and extracts from this signalling information obtained outside of the decoding of services that allow it to create the service lists 221 and 223 and the QoS parameters. According to a variant, during step 71, the decoder 2 performs a connection of interfaces 24 and 25 to the signalling servers 11 and 14 to enable it to construct the service lists 221 and 223, and also performs a connection to the audio/video servers 13 and 16 of the networks 12 and 15 of FIG. 1 respectively, and extracts during their decoding information that enables it to create the QoS parameters. According to another variant, the QoS parameters are obtained both outside of and during the decoding of the services. The step 71 implements a reception of two services lists 221 and 223. An example of QoS parameters that can be obtained outside of decoding is the presence of an error correction code, the power of the corrector code, the variation of the binary bit-rate, and/or even global information on the characteristics of the source network of the service. An example of QoS parameters that can be obtained outside of decoding a service, is the number of errors detected, the number of missing packets, the number of packets out of time, the number of packets out of sequence and/or a variation in the arrival time of packets. According to a variant, other secondary parameters can be used, for example the taking into account of the coding type of a service, a channel compression rate, a source server geographical localisation parameter, and the number of network equipment skips to the source server.

Then, during a step 72, the decoder 2 stores the information thus obtained in the form of QoS parameters, enabling it to determine the QoS and to associate a mark with each element of the lists 222 and 224.

Next, during a step 73, the decoder 2 determines the QoS mark for each of the services and also stores them in the lists 222 and 224. This determination of the QoS mark can be made according to one or more QoS parameters. Naturally, the QoS parameter types obtained by these different means outside of or during decoding as well as the secondary parameters can be combined to determine a QoS mark.

The set of steps 72 and 73 implement a determination of information representative of the QoS in reception for each of the services of each of the lists 221 and 223.

Then, during a step 74, the decoder 2 constructs a concatenation list of services 225. This concatenation comprises the creation of an element for each service that figures only in one of the two lists, and in the creation of a single element for each service that figures in the two lists. This concatenation implements a determination of services representing the same channel according to one or more similarity parameters. These similarity parameters are for example a service name or identifier, a channel identifier associated with a service and a source identifier. According to another variant, these similarity parameters are obtained by the determination of the variation of the video signal or of a part of this signal, obtained outside of decoding, and a correlation between the variations of video signals corresponding to the services of the lists 221 and 223.

According to a variant, this correlation is obtained using a capture of one of the signals to be correlated in two zones of buffer memory, and applying a similarity search of one in relation to the other. According to an advantageous variant, these buffer zones are of variable size, which makes it possible to take into account a possible shift between the different signal sources. According to an advantageous variant, the signals to be correlated are taken after decoding, for example at the output of the video control, which enables the type of coding used to be disregarded.

According to another variant, a reception of a correspondence table enables determination of whether the services of the lists 221 and 223 correspond to the same channel. According to a variant, the determination of one or more similarity parameters linked to the determination of the video signal variation is combined with the reception of a correspondence table The combination of the two methods enables complementarity in cases where the correspondence table does not provide sufficient information and vice versa. In the concatenated list the references to elements of the list 221 and/or 223 are stored, as well as information representative of the associated QoS marks. Step 74 implements a construction of a concatenation list of services 225 comprising services that belong to the first list and the second list.

Next, during a step 75 the decoder 2 positions a pointer, hereafter referred to as "channel to be processed" towards the first element of the concatenated list 225.

Then, during a step 76, the decoder 2 compares the QoS marks for a channel to be processed, and retains the reference to the element of lists 221 or 223 having the best QoS mark. This mark can possibly be obtained after weighting reception quality of service parameters.

Next, during a step 77, the decoder 2 stores the element number retained in step 76, in the channel change list 226.

Next, during a test 78, the decoder 2 checks if the channel to be processed corresponds to the last channel of the concatenated list 225.

If this is not the case, during a step 79, the decoder 2 updates the channel to be processed by assigning to it the next channel from the concatenated list of services.

Then, step 76 is repeated. According to a variant, the decoder 2 eliminates, during a step that is not illustrated, to be inserted between steps 75 and 76, the services from lists 221 or 223 that do not have at least one reception quality of service parameter above a minimum determined value. This variant enables the simple and rapid elimination of services for which a quality parameter does not attain a minimum value. In the case of this variant, the above reiteration includes a step inserted between steps 75 and 76.

If the result of test 78 is positive, all the services of the concatenated list of services were selected according to their QoS, and, during a step 790, the decoder 2 is ready to receive and process the channel requests.

The steps 76 up to 78 implement an automatic selection following a channel request represented by the steps 75 and 79.

FIG. 8 diagrammatically illustrates an algorithm for obtaining a channel change list according to a second embodiment.

Obtaining the channel change list begins with step 80 during which different variables are created and initialised.

Next, during a step 71, the decoder 3 constructs the list of services 221 and 223 by the connection of interfaces 24 and 25 to the signalling servers 11 and 14 of networks 12 and 15 of FIG. 1 respectively and by analysis of signalling information received. This step implements reception of two lists of services 221 and 223.

Then, during a step 81, the decoder 3 constructs a concatenation list of services that corresponds to the list 314 of FIG. 5. This concatenation comprises the creation of an element for each service that figures only in one of the two lists, and in the creation of a single element for each service that figures in the two lists at the same time. In the concatenated list, the references to the elements of the list 221 and/or 223 are stored. This step implements the construction of a concatenation list of services comprising the services that belong to the two lists of services 221 and 223. This concatenation also implements a determination of services representative of a same channel according to one or more similarity parameters. These parameters are obtained for example by a service name or identifier, a channel identifier associated with a service and a source identifier. According to a variant, these parameters can be obtained by the determination and the correlation of the variation of video signals or a part of these video signals of the two services. According to another variant, a received correspondence table can enable the determination of a similarity between two services. According to another variant, these parameters can be obtained by combining the means described above.

Next, during a step 82 the decoder 3 positions a pointer, hereafter referred to as "channel to be processed" towards the first element of the concatenated list 314.

Next, during a test 84, the decoder 3 checks whether the service to be processed corresponds to the last service of the concatenated list.

If this is not the case, during a step 85, the decoder 3 updates the service to be processed by assigning to it the next service from the concatenated list of services. Then, step 83 is repeated.

If the result of test 84 is positive, all the services of the concatenated list of services were selected and, during a step 86, the decoder 3 is ready to receive and process the channel change commands of a user.

FIG. 9 diagrammatically illustrates a progression algorithm of the channel change process according to the second embodiment. Contrary to the first embodiment illustrated by the FIGS. 2, 4 and 7, a special process is carried out during the channel change.

The process begins with a step 90 during which different variables are created and initialised. Notably, this step positions a pointer towards an element of the channel change list, hereafter referred to as the "selected channel" stored in the register 316 of FIG. 3.

Next, the step 91 receives a channel change command.

Then, during step 92, according to the command received, the following or the preceding channel in the channel change list with respect to the current channel, is selected via the functions 60, 24 and 25 of FIG. 6, and the 'selected channel' pointer is updated.

Next, during a step 93 the analysis of the QoS is carried out using the functions 61 and 62 of FIG. 6. The step 93 implements the determination of information representative of the QoS for each of the two services.

Then, during a test 94, the analysis results obtained by the functions 61 and 62 of FIG. 6 are compared using the comparison function 63 of FIG. 6.

If the service coming from the ADSL network has the best QoS mark, then this one is selected during step 95 to supply the display and decoding circuits by means of the function 66 of FIG. 6.

In the contrary case, the service coming from the DTT network is selected during step 96 to supply the display and decoding circuits by means of the function 66 of FIG. 6.

The steps 92 to 96 implement an automatic selection following a channel request.

According to a variant, this automatic selection is carried out following an event such as a change in the composition of the lists of services, a connection to a new network, a disconnection on a network, an update of one or more QoS parameters of a service component, and a modification of a service transport parameter.

According to another variant, the automatic selection is carried out following a channel request and following an event as described above.

Naturally, the invention is not limited to the embodiments previously described.

In particular, the invention concerns domestic or professional decoders accessing at least two different network types by distinct access interfaces. A first network is, for example, a high or low bit-rate Internet network (for example ADSL type or optical fibre type). The second network is, for example, a DTT type network. A third network is, for example, a mobile, satellite and/or cable type network. The distinct networks use distinct or similar types of transport network (notably wired, wireless, satellite, optical, etc.). Likewise, they can use distinct or similar communication protocols (IP, DTT, etc.). For those skilled in the art, the above description enables application of the present invention in a decoder having the possibility to connect to more than two distinct networks, for example 3, 4 even 10 or more.

According to the invention, an audio/video decoding device in a network can receive services and the associated signalling from several sources via several access points, for example, via a modem connected to an ADSL network, or a router connected to the Internet or a satellite antenna. The invention enables the automatic selection of a service from among several services representing the same channel but coming from distinct sources, based on the quality of service of the said services.

The present invention can be applied to different device types, such as a decoder for a digital television, integrated or not into the television, an audio/visual recording device and a mobile reception device.

The invention claimed is:

1. A method of selection of audio and/or video services, wherein said method is implemented by a hybrid receiver receiving said audio and/or video services from distinct networks of different types to which said hybrid receiver is connected via distinct interfaces, said method comprising the steps of:
    determining of at least two of said audio and/or video services representative of a same channel, and being received via distinct networks, according to at least one similarity parameter that comprises a correlation of a variation of signals corresponding to said at least two of said audio/and or video services, and
    selecting one of said determined at least two of said audio and/or video services according to at least one service quality parameter associated with each of said at least two of said audio and/or video services, where at least one of said quality of service parameter associated to at least one of said at least two of said audio and/or video services is obtained by extracting signalling information from a signalling server, said signalling being associated with each of said at least one of said at least two of said audio and/or video services.

2. The method according to claim 1, wherein said at least one of said quality of service parameters comprises at least one from a first group of service parameters, said first group comprising:
    presence of an error correction code associated with said at least two of said audio and/or video services,
    a correction power of an error correction code associated with said at least two of said audio and/or video services,
    a binary bit-rate of said at least two of said audio and/or video services,
    a variation of service bit-rates of said at least two of said audio and/or video services, and
    global information on characteristics of networks used to transport said at least two of said audio and/or video services.

3. The method according to claim 1, wherein said at least one of said quality of service parameter comprises at least one from a second group of service parameters, obtained during decoding said at least two of said audio and/or video services, said second group comprising:
- a number of errors detected in decoding said at least two of said audio and/or video services,
- a number of missing packets of said at least two of said audio and/or video services,
- a number of packets of said at least two of said audio and/or video services, received out of time,
- a number of packets of said at least two of said audio and/or video services, received out of sequence, and
- a variation in arrival time of packets from said at least two of said audio and/or video services.

4. The method according to claim 1, wherein said step of selecting is performed depending on several quality of service parameters associated with each of said at least two of said audio and/or video services.

5. The method according to claim 4, further comprising weighting of said several quality of service parameters, said selecting being performed as function of said weighting.

6. The method according to claim 1, wherein said step of selecting further comprises eliminating of at least one of said at least two of said audio and/or video services of which at least one of said quality of service parameter has not attained a determined minimum value.

7. The method according to claim 1, wherein said step of selecting further comprises taking into account at least one secondary parameter associated with each of said at least two of said audio and/or video services.

8. The method according to claim 7, wherein said at least one secondary parameter comprises at least one of:
- a coding type parameter of said at least two of said audio and/or video services,
- a compression rate of said at least two of said audio and/or video services,
- a source server geographical localisation parameter of said distinct networks, and
- a parameter indicating a number of network equipment hops to a source server of said distinct networks.

9. The method according to claim 1, wherein said at least one similarity parameter comprises at least one of:
- a service name,
- a service identifier,
- an identifier of a channel associated with a service, and
- a source identifier.

10. The method according to claim 1, further comprising obtaining said at least one similarity parameter, by:
- determining variation of at least part of video signals corresponding to said at least two of said audio and/or video services and obtained during decoding, and
- correlating between said variation of at least part of video signals corresponding to said at least two of said audio and/or video services.

11. The method according to claim 1, wherein said step of selecting is performed following a channel change request.

12. The method according to claim 1, wherein said step of selecting is performed following a predetermined event, said predetermined event being at least one of:
- a change in composition of a list of audio and/or video services,
- a connection to a new network,
- a disconnection from a network, and
- a modification of at least one of said quality of service parameter.

\* \* \* \* \*